(12) United States Patent  (10) Patent No.: US 8,478,242 B2
Mathew et al.  (45) Date of Patent: *Jul. 2, 2013

(54) EMERGENCY RINGING FACILITY FOR MOBILE PHONES

(75) Inventors: George Mathew, Kerala State (IN); Kotaro Matsuo, Poway, CA (US)

(73) Assignee: KYOCERA Corporation, Kyoto (JP)

( * ) Notice: Subject to any disclaimer, the term of this patent is extended or adjusted under 35 U.S.C. 154(b) by 1035 days.

This patent is subject to a terminal disclaimer.

(21) Appl. No.: 12/496,461

(22) Filed: Jul. 1, 2009

(65) Prior Publication Data

US 2009/0270080 A1  Oct. 29, 2009

Related U.S. Application Data

(63) Continuation of application No. 11/380,348, filed on Apr. 26, 2006, now Pat. No. 7,606,561.

(51) Int. Cl.
*H04M 1/663* (2006.01)
(52) U.S. Cl.
USPC ............. 455/412.2; 455/412.1; 455/414.1; 455/414.3; 455/422.1; 379/207.11; 379/208.01; 379/204.01
(58) Field of Classification Search
USPC .......... 455/412.1, 412.2, 414.1, 414.3, 422.1; 379/207.11, 208.01, 204.01
See application file for complete search history.

(56) References Cited

U.S. PATENT DOCUMENTS

| 5,845,219 | A | 12/1998 | Henriksson |
| 6,289,084 | B1 | 9/2001 | Bushnell |
| 6,377,795 | B1 | 4/2002 | Bach et al. |
| 2003/0003901 | A1 | 1/2003 | Kuroiwa |
| 2003/0040298 | A1 | 2/2003 | Heatley |
| 2003/0109246 | A1 | 6/2003 | Shimizu et al. |
| 2003/0224803 | A1 | 12/2003 | Konno |
| 2004/0203695 | A1 | 10/2004 | Mikan |
| 2004/0255271 | A1 | 12/2004 | Lim |
| 2005/0008135 | A1 | 1/2005 | Bressler |
| 2005/0015456 | A1 | 1/2005 | Martinson |
| 2005/0075096 | A1 | 4/2005 | Aljuraid |
| 2005/0096030 | A1* | 5/2005 | Boyd et al. ..................... 455/419 |
| 2005/0107077 | A1 | 5/2005 | Hintermeier et al. |
| 2005/0267799 | A1 | 12/2005 | Chan et al. |
| 2005/0286701 | A1* | 12/2005 | Suvanne et al. .......... 379/207.11 |

(Continued)

FOREIGN PATENT DOCUMENTS

| JP | 09-130496 | 5/1997 |
| JP | 11-205458 | 7/1999 |
| JP | 2003-070067 | 3/2003 |
| JP | 2004-104550 | 4/2004 |

*Primary Examiner* — Justin Lee (57) ABSTRACT

Systems and methods for an emergency ringing facility able to remotely override a silent mode of a wireless communication device are disclosed. The systems comprise profile-management applications residing on wireless devices and allowing one user of a wireless device to override a silent mode of a remote wireless device. The profile management application executed on the wireless device queries whether the silent mode of the remote wireless device can be overridden, and if so, communicates with a profile-management application executed on the remote device and overrides the silent mode of that device. In an alternative embodiment, a silent mode of a wireless device can be overridden by a profile management server. A profile-management application is executed on a profile-management server communicating with a profile-management application executed on a wireless device and requests the overriding of the silent mode of a remote wireless device.

18 Claims, 6 Drawing Sheets

U.S. PATENT DOCUMENTS

2006/0121887 A1  6/2006  Chilukoor
2006/0293090 A1  12/2006 Adams et al.
2007/0037605 A1  2/2007  Logan
2007/0135103 A1* 6/2007  Middleton ................ 455/414.1

* cited by examiner

| Phone Number | Name | Override Code |
|---|---|---|
| 555-555-5555 | John Smith | 33333 |
| 333-123-4567 | Mary Jones | |
| 222-987-6543 | Tom Black | 12345 |
| ... | | |

Phonebook  32

FIG. 3A

| Phone Number | Override Code |
|---|---|
| ... | |
| 555-555-5553 | 11111 |
| 555-555-5554 | 34567 |
| 555-555-5555 | 33333 |
| 555-555-5556 | 56789 |
| 333-123-4567 | 55300 |
| ... | |

Phonebook  39

EMERGENCY RINGING FACILITY FOR MOBILE PHONES

RELATED APPLICATION

The present application is a continuation of U.S. patent application Ser. No. 11/380,348 filed Apr. 26, 2006 now U.S. Pat. No. 7,606,561, which is incorporated herein by reference in its entirety.

FIELD OF THE INVENTION

The present invention generally relates to wireless communication devices and more particularly relates to overriding a silent mode of a remote wireless communication device to establish an interactive communication between two wireless communication devices.

BACKGROUND

Wireless communication devices (e.g., cellular phones) provide a very convenient way of communicating between their users. But, even in emergency situations, such communication between the users is impossible if, for example, the receiving call wireless device is put into a silent mode.

Nevertheless, there are many situations when a user might want to put a device into a silent mode so the device does not ring when it receives a call. Examples of such situations include circumstances where the "ringing" would interfere with other activities (e.g. sleeping, conducting a meeting, etc.); would present interference to an audience (e.g. in theatres or conferences); or would present a risk to safe travel, for example, on commercial airlines during take-off and landing.

However, very often the device remains in a silent mode for no other reason than just because the user forgot to change the silent mode of the device to an active mode. Furthermore, there are situations where the silent mode of the device should be overridden regardless of whether the user is asleep, attending a meeting, or just forgot to turn the ringer on. For example, there are emergency situations where contacting the cellular phone user is critical. In those situations, overriding the silent mode of the device may be appropriate.

There are several systems and methods in the art designed to change the settings and profiles of users of wireless devices. For example, U.S. Published Patent Application US 2005/0107077 A1 to Hintermeier et al. discloses a method of remotely reconfiguring a portable radio device by adjusting its ringer volume, shutting it down, etc. The application discloses a control station ("radio commander") which can detect the presence of a portable radio device within the controlled area, and can send a command to the portable radio device to change an internal setting of the device, such as, for example, to reduce the volume of the device, or to turn the device off. The radio commander can send such a command over out-of-band channels and protocols so it does not interfere with normal cellular telephone traffic. However, the radio commander is only a short range communication device and, thus, it allows communication with portable radio devices only if they come within the short range of the radio commander. Furthermore, the invention does not provide for sending a command to change an internal setting of one portable device by another user from another portable device.

Another example is U.S. Published Patent Application US 2004/0203695 A1, which discloses a system and method for changing the settings of a communication device relative to the instant messaging presence of a user profile, logged into the communication device on a telecommunications network. The system comprises a communication device that receives a changed instant messaging presence indicator regarding the user profile from the telecommunications network, determines the settings corresponding to changed instant messaging presence, and then changes the settings, such as the ring volume, display options such as increased or decreased brightness, etc.

Yet another example is U.S. Published Patent Application US 2005/0096030 A1, which discloses a system and method for controlling a wireless communication device by Dual Tone, Multi-Frequency ("DTMF") commands. The system can accept and process DTMF control signals sent over the air on a voice connection as commands such as for example, to cause a cellular phone to ring even though it has been configured into a silent mode. The control signals can be received under an "auto-answer" scheme, or as a unique signal (e.g., a special packet data command) that established the voice connection. After receiving the control signal, the device can enter a command mode where the remote user can send commands that operate the device remotely.

However, until now, there has been no system allowing a user of one wireless communication device to override the setting of another wireless communication device. Accordingly, what is needed is a system and method that allows two wireless devices to communicate with each other (directly or indirectly) using e.g. Short Message Service ("SMS") protocol or Internet Protocol ("IP") to override the silent mode of another wireless communication device.

SUMMARY

An exemplary emergency ringing facility comprises a profile-management application for wireless devices, where the profile-management application executed on one wireless communication device communicates with another profile-management application executed on another wireless device to inquire whether the remote wireless communication device is in a silent mode, and if so, to override that mode.

Other features and advantages of the present invention will become more readily apparent to those of ordinary skill in the art after reviewing the following detailed description and accompanying drawings.

DETAILED DESCRIPTION

Certain embodiments as disclosed herein provide for systems and methods for an emergency ringing facility comprising a profile-management application for wireless communication devices, also referred herein as "handsets." For example, one method as disclosed herein allows for the profile-management application executed on one handset to communicate with a profile-management application on another handset (hereafter a "remote handset") to inquire whether the remote device is in a silent mode, and if so, to override that mode.

Another method disclosed herein allows for the profile-management application executed on one handset to communicate with a profile-management application executed on a profile management server to request that the profile management server override a silent mode of a remote device.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1A:
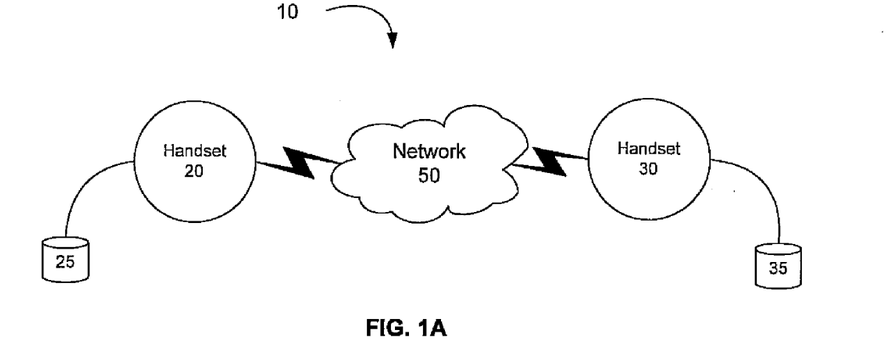
FIG. 1A is a block diagram illustrating an example system for an emergency ringing facility according to an embodiment of the present invention.

FIG. 1A is a block diagram illustrating an example system 10 for an emergency ringing facility according to an embodiment of the present invention. In the illustrated embodiment, the system 10 comprises a handset 20 configured with a data storage area 25 and a (remote) handset 30 configured with a data storage area 35. The handset 20 and handset 30 communicate over a network 50.

The network 50 can be, for example, a wireless communication network, wired communication network, common network packet switched, circuit switched, Personal Area Network ("PAN"), Local Area Network ("LAN"), Metropolitan Area Network ("MAN"), Wide Area Network ("WAN"), public network, private network, or any combination, such as the Internet.

In an alternative embodiment, the system 10 may contain more than two handsets 20 and 30, as will be understood by those having skill in the art. For the sake of simplicity of this description, however, the embodiment described here will include a single handset 20 and a single handset 30.

The handsets 20 and 30 can be any of a variety of wireless communication devices, including a cell phone, Personal Digital Assistant ("PDA"), personal computer ("PC"), or any combination of these and other devices capable of establishing a communication between the handsets 20 and 30. Handsets can be co-located or geographically remote.

The data storage areas 25 and 35 can be any type of internal or external memory device and may include both persistent and volatile memories. The function of the data storage areas 25 and 35 is to maintain data for long term storage, such as, for example, frequently dialed numbers. Another function of the data storage areas 25 and 35 is to provide efficient and fast access to instructions for a profile management application executed by the handset 20 or 30.

The handsets 20 and 30 communicate over the network 50 which can include a wireless network, IP network, SMS network, etc. The network 50 can facilitate a variety of communication standards. For example, cellular systems are currently used for the communication of voice and data in accordance with many different standards. Such standards include Global System for Mobile Communications ("GSM"), GSM Packet Radio Service ("GPRS"), Code Division Multiple Access ("CDMA-200"), Personal Handyphone ("PHS"), Digital Advanced Mobile Phone Service ("DAMPS"), Wireless Fidelity ("WiFi"), and others.

There are currently many more standards in use and in development as well as many private, closed standards in use. For example, the network 50 can utilize the IP to facilitate wireless as well as wireline communication between devices such as PC.

Figure 1B:
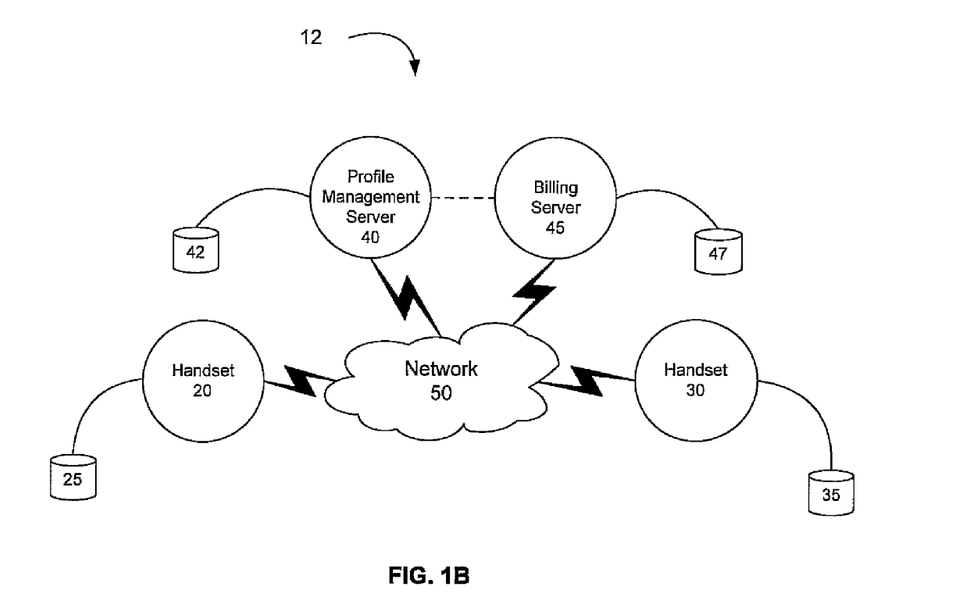
FIG. 1B is a block diagram illustrating an example system for an emergency ringing facility according to an embodiment of the present invention.

FIG. 1B is a block diagram illustrating an example system 12 for an emergency ringing facility according to another embodiment of the present invention. In the illustrated embodiment, the system 12 comprises a handset 20 configured with a data storage area 25 and a second handset 30 configured with a data storage area 35, both the handset 20 and handset 30 communicate over a network 50.

The system 12 also comprises a profile management server 40 that is configured with a data storage area 42 and able to communicate with the network 50. Furthermore, the profile management server 40 may also communicate with a billing server 45 coupled with a data storage area 47 to perform billing transactions on the user account for the handset 20. The billing server 45 can communicate with the profile management server 40 and with the network 50.

Figure 2A:
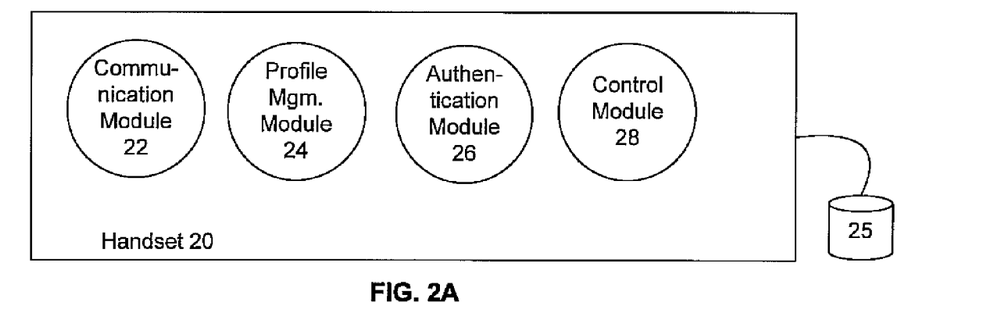
FIG. 2A is a block diagram illustrating exemplary modules residing on a handset according to an embodiment of the present invention.

FIG. 2A is a block diagram illustrating exemplary modules residing on an example handset 20 according to an embodiment of the present invention. In the illustrated embodiment, the handset 20 comprises a communication module 22, a profile management module 24, an authentication module 26, a control module 28 and data storage 25. The communication module 22 is configured to establish a data communication link with a remote handset when no voice communication is available. The communication link can be established over a wired or wireless medium. Furthermore, the communication link can be direct or indirect. References to the modules 22, 24, 26 and 28, and data storage 25 throughout the description of the FIG. 2A are intended to apply not only to the handset 20, but also to the remote handset 30.

In one embodiment, when a voice call to a remote handset fails, the user of the handset 20 contacts the profile management application on the remote handset to inquire about the status of the remote handset. In order to contact the profile management application on the remote handset, the communication module 22 on handset 20 establishes a data communication link between the profile management module 24 on the handset 20 and the profile management module on the remote handset. Once the link is established, the handset 20 can inquire whether the remote handset is in the silent mode, and if so, request to override the silent mode of the remote handset.

The profile management module 24 provides a user interface for accepting user input, overseeing the communication process and querying the mode of the remote device. For example, the profile management module 24 on the handset 20 can obtain an override code of a remote handset, send the override code to the remote handset over a network and override a silent mode of the remote handset. The override code can be obtained, for example, from the data storage 25, from user input, or from a network server.

The handset 20 comprises the data storage area 25, which includes a phonebook containing user profile information input by the user of the handset 20. A phonebook entry contains information whether the user of the wireless device can override the mode of other wireless communication devices. For example, if a user of the handset 20 is authorized to override a silent mode of a particular remote wireless communication device, then the phonebook entry containing the profile of the user of the remote wireless communication device includes an overriding code. If the user of the handset 20 is not authorized to override a silent mode of the remote wireless communication device, then the entry containing the profile of the user of the remote wireless communication device does not contain the overriding code. In an alternative embodiment, profile information of each user may be stored in a dedicated application (or not stored on handset 20 at all) and input through an application specific GUI (graphical user interface) each time the user of handset 20 wants to override a silent mode of a particular wireless communication device.

The authentication module 26 on the handset 20 verifies whether the silent mode of a handset 30 can be overridden. To verify that, the authentication module 26 determines whether the overriding code can be provided for the user who requested the overriding. In one embodiment, the overriding code can be provided by the user who requested overriding of the silent mode of the remote handset 30. Alternatively, the override code can be obtained from the handset's own database. Also, the overriding code can be provided by the profile management server.

If the authentication module 26 on the handset 20 receives the overriding code for the remote handset 30 and the request to override the silent mode, it passes the code and the request to the control module 28, which in turn, queries the mode of the device, and if possible, turns on the ringing or vibrating feature on the device. If the authentication module 26 receives a message about the absence of the overriding code, it passes that message back to the communication module 22, which in turn, sends a request rejection message to the user who requested the overriding.

The control module 28 is configured to turn on and off the ringer of the handset 20. For example, if another handset requests to override the silent mode of the handset 20, the control module 28 of the handset 20 may turn on the ringer of the handset 20. Alternatively, if another handset requested to turn on the silent mode of the handset 20, then the control module 28 of the handset 20 may turn off the ringer of the handset 20.

Figure 2B:
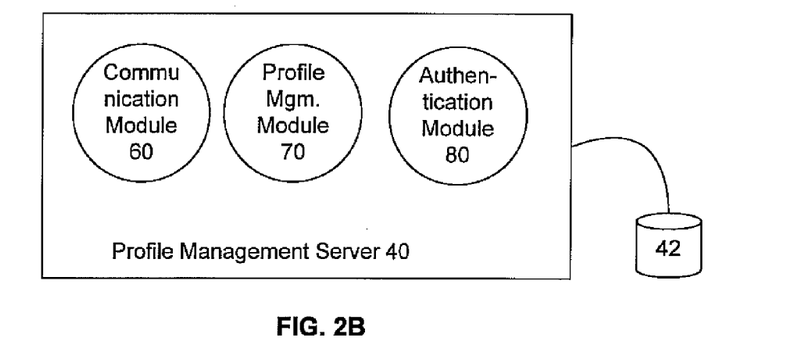
FIG. 2B is a block diagram illustrating exemplary modules residing on a profile management server according to an embodiment of the present invention.

FIG. 2B is a block diagram illustrating exemplary modules residing on a profile management server 40 according to an embodiment of the present invention. In the illustrated embodiment, the profile management server 40 comprises a communication module 60, a profile management module 70 and an authentication module 80.

The communication module 60 residing on the profile management server 40 is configured to work with the communication module 22 residing on a handset to establish a data communication link between the profile management server 40 and the handset. The communication link can be established over a wired or wireless medium. Furthermore, the communication link can be direct or indirect.

In one embodiment of the present invention, a request to override the silent mode of the remote handset may be sent by the profile management server 40. For example, if the user of a handset 20 is not eligible to override the silent mode of the remote handset 30, the user of the handset 20 may contact the profile management server 40 and request that the server override the silent mode of the remote device 30.

The communication module 60 is configured to establish a data communication link with a handset who requests an override and the remote handset whose mode is requested to be overridden. The communication link can be established over a wired or wireless medium. Furthermore, the communication link can be direct or indirect.

The profile management module 70 provides a user interface for accepting input from the user of the handset, overseeing the communication process with another handset, querying the mode of the remote device and overriding the silent mode of a handset. The profile management server 40 also maintains a data storage area 42 that can be used as a phonebook containing profile information about users. In one embodiment, the phonebook holds entries for the subscribers on the profile management server 40. Among other information, a phonebook's entry may contain either the overriding code to override the mode of the handset or the information that the mode can not be overridden. For example, if the entry for a user of the particular handset contains an overriding code, the profile management server 40 can send the overriding code to that handset with a request to override the mode of the device. If the entry for a handset does not contain an overriding code, the profile management server 40 can not request the overriding of the handset's mode, unless the profile management server 40 has a special overriding privilege.

To override the silent mode of a handset, the profile management module 70 has to obtain an override code of that handset. The override code may be obtained from a variety of sources. For example, the profile management module 70 can obtain the override code from a target handset 30, a requesting handset 20, or data storage 42 (as described above), or from the user's request.

The authentication module 80 verifies whether the silent mode of a handset can be overridden. To verify that, the authentication module 80 has to determine whether the overriding code can be provided on behalf of the user who requested the overriding. There are many ways to provide an overriding code. For example, the overriding code can be provided by the user who requested overriding of the silent mode of the remote handset. Alternatively, it can be obtained from the target handsets own database. Also, the overriding code can be provided by the profile management server from the profile management's phonebook 42.

The overriding code or the message about the absence of the overriding code is passed by the communication module 60 to the profile management module 70, and then to the authentication module 80. Upon receiving the overriding code for a remote handset and the request to override the silent mode, the authentication module 80 passes the code and the request to the communication module 60, which in turn, sends them to the communication module of the remote handset whose mode has to be overridden. If the authentication module 80 receives a message about the absence of the overriding code, it passes that message back to the communication module 60, which in turn, sends a request rejection message to the user who requested the overriding.

In another embodiment, the profile management module 70 residing on the profile management server 40 can override the mode of any handset included in the service subscription even if an overriding code for that device is not stored in the server's or handset's phonebooks. To accomplish this type of overriding, the profile management server 40 may use a special code or privilege. For example, upon receiving a request to override the mode of a remote handset 30, the profile management module 70 residing on the profile management server 40 can use its special overriding privilege to override the mode of the remote handset without requesting the device override code.

Figure 3A:
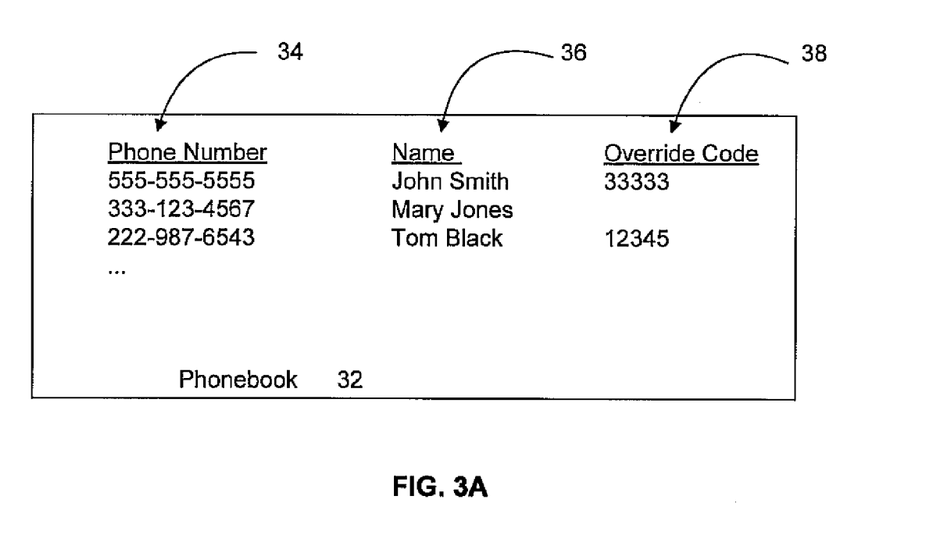
FIG. 3A is a block diagram illustrating an example handset phonebook according to an embodiment of the present invention.

FIG. 3A is a block diagram illustrating an example handset phonebook 32 according to an embodiment of the present invention. In the illustrated embodiment, the phonebook 32 contains information about users of other handsets. That information can also be used by the profile management module of the handset 20 to verify if the user of the handset 20 is authorized to override a silent mode of a particular remote wireless device. The phonebook information is stored in a data storage area accessible by the handset 20. Alternatively, the phonebook 32 can be stored in a data storage area attached to the remote handset 30.

The phonebook 32 comprises a sequence of records ("entries") containing profile information of a user of the remote handset. For example, an entry for a given user may contain a user phone number 34, a user name 36, and a user override code 38.

Alternatively, an entry for a given user may contain only a user phone number 34 and user name 36, but no override code 38. If the entry for the user of a remote handset does not contain an override code, then the user of the handset 20 is not authorized to directly override the silent mode of the remote handset. However, the silent mode of the remote handset can still be overridden by the profile management server 40. The user requesting the overriding of the silent mode of the remote handset can contact the profile management server 40 and request that the profile management server 40 access the server database, retrieve the overriding code for the remote handset and override the silent mode of the remote handset.

The phonebook information such as the phone number 34 and user name 36 can be input by the user of the handset for each entry of the phonebook 32. The override code 38 can be updated by the profile management module 24 residing on the handset 20 or the profile management module 24 residing on the profile management server 40.

Figure 3B:
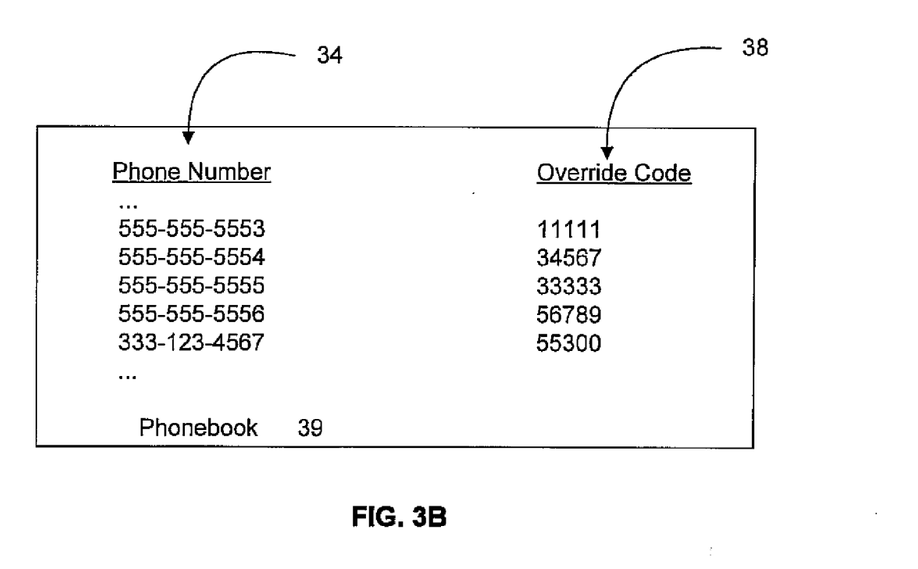
FIG. 3B is a block diagram illustrating an example profile management server phonebook according to an embodiment of the present invention.

FIG. 3B is a block diagram illustrating an example profile management server phonebook 39 according to an embodiment of the present invention. In the illustrated embodiment, the phonebook 39 contains information about the subscribers and is used by the profile management server to override silent modes of other wireless devices. The phonebook information is stored in a data storage area attached to a profile management server 40.

The phonebook 39 comprises a sequence of records ("entries") containing profile information for all service subscribers serviced by the given profile management server. In the illustrated embodiment, an entry for a subscriber (a "user") contains a user phone number 34 and a user override code 38. Because each user entry contains the user override code 38, the profile management server can override the silent mode of a handset of any user listed in the phonebook 39. Thus, if a user of a handset is not authorized to directly override the silent mode of a remote handset, the profile management server can. For example, although the user of the handset illustrated in FIG. 3A is not authorized to override the silent mode of Mary Jones' handset (the phonebook 32 does not contain an override code for Jones' handset), the profile management server can override the silent mode of Jones' handset because the phonebook 39 has Jones' override code as illustrated in FIG. 3B.

Figure 4A:
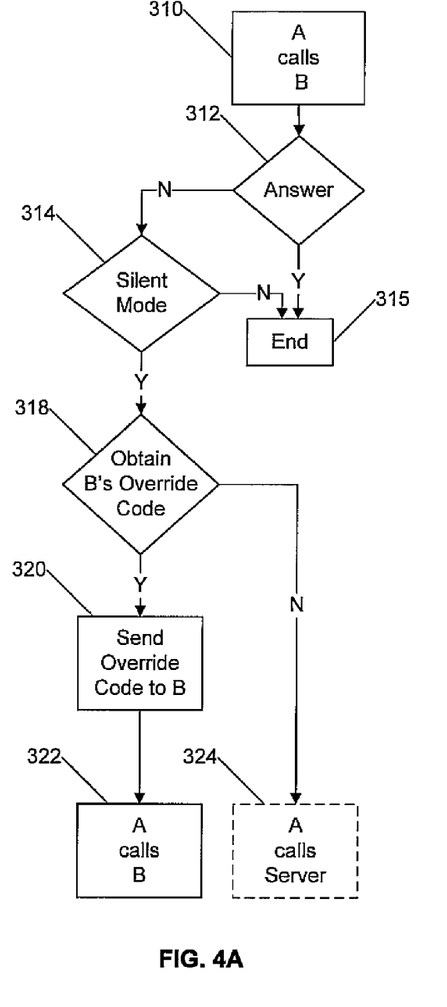
FIG. 4A is a flow chart illustrating an example process for emergency handset ringing facility according to an embodiment of the present invention.

FIG. 4A is a flow chart illustrating an example process for emergency handset ringing facility according to an embodiment of the present invention. In the illustrated embodiment, the process contains steps necessary to identify a lack of response from the remote handset, determine whether the remote handset is in a silent mode and override the silent mode of the remote wireless communication device if possible.

In a step 310, a user "A" of the handset 20 calls a user "B" of a remote handset 30. In order to establish a communication voice link between the user "A" and the remote user "B," the remote user "B" has to accept the incoming call by, e.g., pressing a "send" button, etc. But, the remote user "B" may not be able to accept the incoming call from the user "A" if, e.g., the remote handset is put in a silent mode. In such a case, the user "A" is unable to establish a voice communication link with the user "B" and is unable to receive an answer from the user "B."

In a decision step 312, the user "A" of the handset 20 queries the remote device of the user "B" to determine whether the user "B" can accept the call from the user "A." If the user "A" determines that the user "B" accepted the call from the user "A," the voice communication link between "A" and "B" is established and the profile management of the handset "A" does not have to provide any further assistance to the user "A." This is illustrated in a step 315.

If the user "A" determines a lack of response from the user "B," then in a step 314, the user "A" queries a profile management module residing on the handset 20 to verify whether the remote handset 30 is put into a silent mode. To do that, a communication module residing on the handset 20 establishes a data communication link with a communication module residing on the handset 30. Once such a link is established, the profile management of the remote handset 30 sends the mode status of the remote handset 30 to the profile management of the handset 20.

If the user "A" determines that the remote handset "B" is not put in the silent mode, then there is some other reason for the user "B" to reject the call from the user "A." In such a case, the profile management module does not offer the user "A" any further assistance in establishing a voice communication link with the remote user "B." This is illustrated in the step 315.

In a decision step 318, the user "A" determines whether it is necessary to override the silent mode of the remote handset "B." If the user "A" decides to request that the silent mode of the remote handset "B" be overridden, the user "A" instigates the request to bring the remote handset "B" out of the silent mode. Though this process can be automated, in the preferred embodiment, the user "A" manually starts the process since the user "A" should be aware that he is potentially waking up the user "B."

If the user "A" requests the silent mode of the remote handset "B" be overridden, the profile management module determines whether the override code for the remote handset "B" can be obtained. As it was described above, in order to obtain the override code for the remote handset, the profile management module can query its own phonebook 32 (FIG. 3A), a user "B" phonebook, or it can query a phonebook 39 of the profile management server 40 (FIG. 3B).

If the override code for the remote user "B" can not be obtained (neither from the user "A" phonebook 32, nor from the user "B" phonebook), then, the user "A" can either abandon the attempts to contact the user "B", or the user "A" can call the profile management server 40 and ask for further assistance.

If the override code for the remote user "B" can be obtained, then, in a step 320 the profile management module residing on the handset "A" sends that code along with a request to override the silent mode to the profile management module residing on the remote wireless device. The profile management application can send the override code in a variety of ways. For example, the override code can be sent by an application facilitating wireless communication, a wireless firmware upgrade application, a handset (wireless communication device) or any other similar method.

Once the silent mode of the remote handset "B" is overridden, the user "A" of the handset 20 can redial the phone number for the remote handset 30 of the user "B."

Figure 4B:
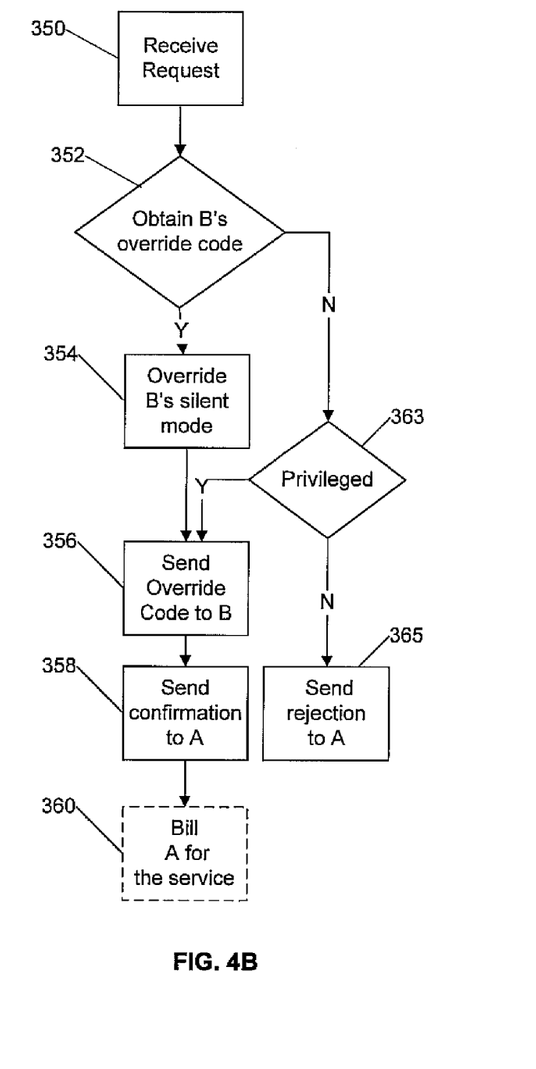
FIG. 4B is a flow chart illustrating an example process for emergency server ringing facility according to an embodiment of the present invention.

FIG. 4B is a flow chart illustrating an example process for emergency server ringing facility according to an embodiment of the present invention. In the illustrated embodiment, the process for emergency server ringing facility comprises the receiving of a request from a user "A" of a handset 20, who was unsuccessful in contacting a remote user "B" of a remote wireless communication device 30, attempting to override the silent mode of the remote wireless communication device 30, and communicating the results of the attempt to the user "A."

In a step 350, a profile management server receives a request from the user "A" who was unsuccessful in communicating with the user "B" of the remote wireless communication device.

In a decision step 352, the profile management server verifies whether the profile management module can obtain the overriding code for the remote handset "B" either from the user "A," or from the user "B." If the overriding code for the remote handset "B" can not be obtained, then, in a step 363, the profile management server checks whether the server has a privilege to override the silent mode of the remote device without obtaining the override code from either the user "A" or the user "B."

If the server determines that it is not privileged to override the silent mode of the remote device, then, in a step 365, the profile management server sends a service rejection message to the user "A" and terminates the data communication link with the user "A."

If the server determines that it can obtain the overriding code to override the silent mode of the remote wireless communication handset "B," then in a step 354, the profile management server obtains that code from either the user "A" phonebook, or from the user "B" phonebook.

In a step 356, the profile management server sends the override code to the profile management module on the remote wireless communication device and overrides the silent mode of the remote device. In one embodiment, only a user who has the overriding code for the remote handset "B" can use that code and successfully request that the silent mode of the remote handset "B" be overridden.

Alternatively, in the step 356, the profile management server sends a special privileged code (e.g. an administrator password) to override the silent mode of the remote device.

In one embodiment, the silent mode of the remote handset "B" can be overridden until the remote handset "B" sets the device into the silent mode again. In another embodiment, the silent mode of the remote handset "B" can be overridden for a set period of time, usually determined by the user of the remote handset "B." In yet another embodiment, the remote handset "B" will ring from any phone provided that the calling phone is supplying the correct overriding code for the remote handset "B."

In one embodiment, the silent mode of the remote handset "B" can be deactivated only for the time of the current call, after which it can be activate again. However, the silent mode can be reactivated when the user "B" accepts the call from the user "A." The silent mode can also be reactivated after one round of ringing of the user handset "B." Furthermore, the silent mode can also be reactivated once the user "A" terminates calling the remote handset "B."

Then, in a step 358, the profile management server sends a confirmation to the user "A" that the silent mode of the remote wireless communication device was successfully overridden.

A step 360 is optional. If the wireless service provider charges a fee for such a service as the overriding of the silent mode of another wireless device, then after the profile management sends the confirmation to the user "A," the billing server 45 bills the user "A" for the provided service.

Figure 5:
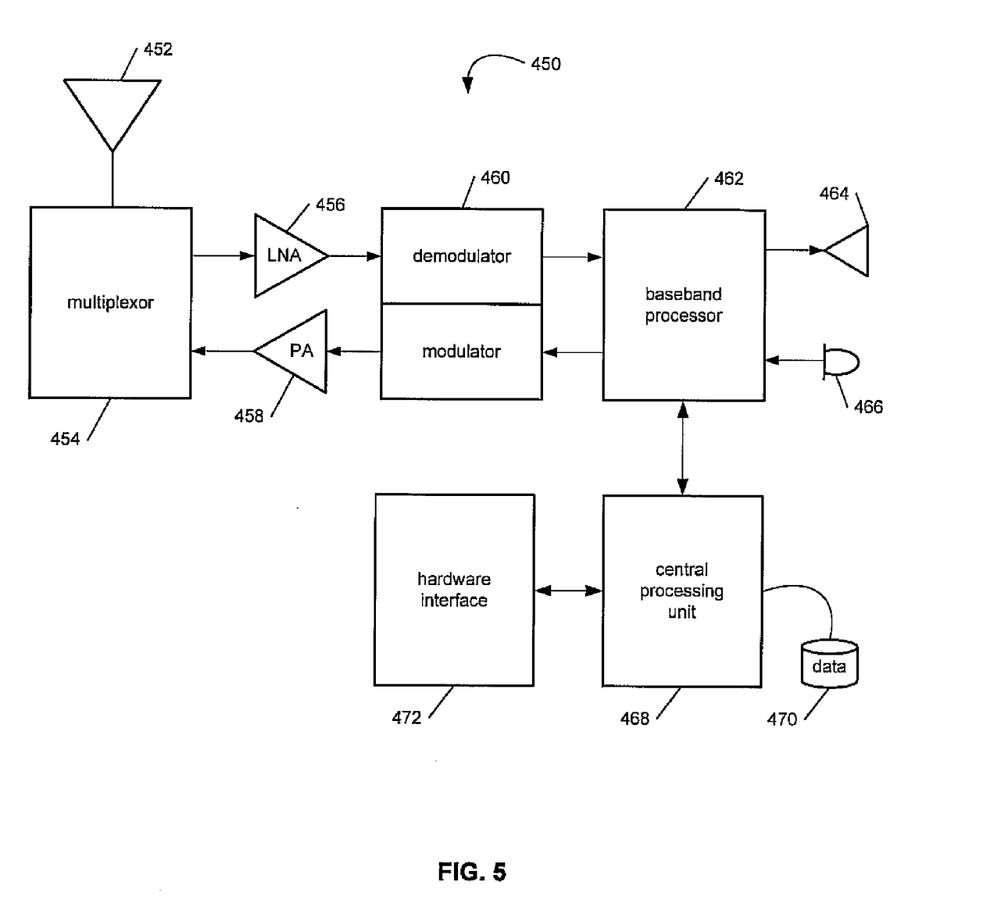
FIG. 5 is a block diagram illustrating an exemplary wireless communication device that may be used in connection with the various embodiments described herein.

FIG. 5 is a block diagram illustrating an exemplary wireless communication device 450 that may be used in connection with the various embodiments described herein. For example, the wireless communication device 450 may be used in conjunction with a handset as described above with respect to FIG. 1. However, other wireless communication devices and/or architectures may also be used, as will be clear to those skilled in the art.

In the illustrated embodiment, wireless communication device 450 comprises an antenna 452, a multiplexor 454, a low noise amplifier ("LNA") 456, a power amplifier ("PA") 458, a modulation circuit 460, a baseband processor 462, a speaker 464, a microphone 466, a central processing unit ("CPU") 468, a data storage area 470, and a hardware interface 472. In the wireless communication device 450, radio frequency ("RF") signals are transmitted and received by antenna 452. Multiplexor 454 acts as a switch, coupling antenna 452 between transmit and receive signal paths. In the receive path, received RF signals are coupled from a multiplexor 454 to LNA 456. LNA 456 amplifies the received RF signal and couples the amplified signal to a demodulation portion of the modulation circuit 460.

Typically modulation circuit 460 will combine a demodulator and modulator in one integrated circuit ("IC"). The demodulator and modulator can also be separate components. The demodulator strips away the RF carrier signal leaving a base-band receive audio signal, which is sent from the demodulator output to the base-band processor 462.

If the base-band receive audio signal contains audio information, then base-band processor 462 decodes the signal and converts it to an analog signal. Then the signal is amplified and sent to the speaker 464. The base-band processor 462 also receives analog audio signals from the microphone 466. These analog audio signals are converted to digital signals and encoded by the base-band processor 462. The base-band processor 462 also codes the digital signals for transmission and generates a base-band transmit audio signal that is routed to the modulator portion of modulation circuit 460. The modulator mixes the base-band transmit audio signal with an RF carrier signal generating an RF transmit signal that is routed to the power amplifier 458. The power amplifier 458 amplifies the RF transmit signal and routes it to the multiplexor 454 where the signal is switched to the antenna port for transmission by antenna 452.

The baseband processor 462 is also communicatively coupled with the central processing unit 468. The central processing unit 468 has access to a data storage area 470. The central processing unit 468 is preferably configured to execute instructions (i.e., computer programs or software) that can be stored in the data storage area 470. Computer programs can also be received from the baseband processor 462 and stored in the data storage area 470 or executed upon receipt. Such computer programs, when executed, enable the wireless communication device 450 to perform the various functions of the present invention as previously described. For example, data storage area 470 may include an active module (not shown) that tracks the active input device while the wireless communication device 450 is connected to a remote device.

In this description, the term "computer readable medium" is used to refer to any media used to provide executable instructions (e.g., software and computer programs) to the wireless communication device 450 for execution by the central processing unit 468. Examples of these media include the data storage area 470, microphone 466 (via the baseband processor 462), antenna 452 (also via the baseband processor 462), and hardware interface 472. These computer readable mediums are means for providing executable code, programming instructions, and software to the wireless communication device 450. The executable code, programming instructions, and software, when executed by the central processing unit 468, preferably cause the central processing unit 468 to perform the inventive features and functions previously described herein.

The central processing unit is also preferably configured to receive notifications from the hardware interface 472 when new devices are detected by the hardware interface. Hardware interface 472 can be a combination electromechanical detector with controlling software that communicates with the CPU 468 and interacts with new devices.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

Figure 6:
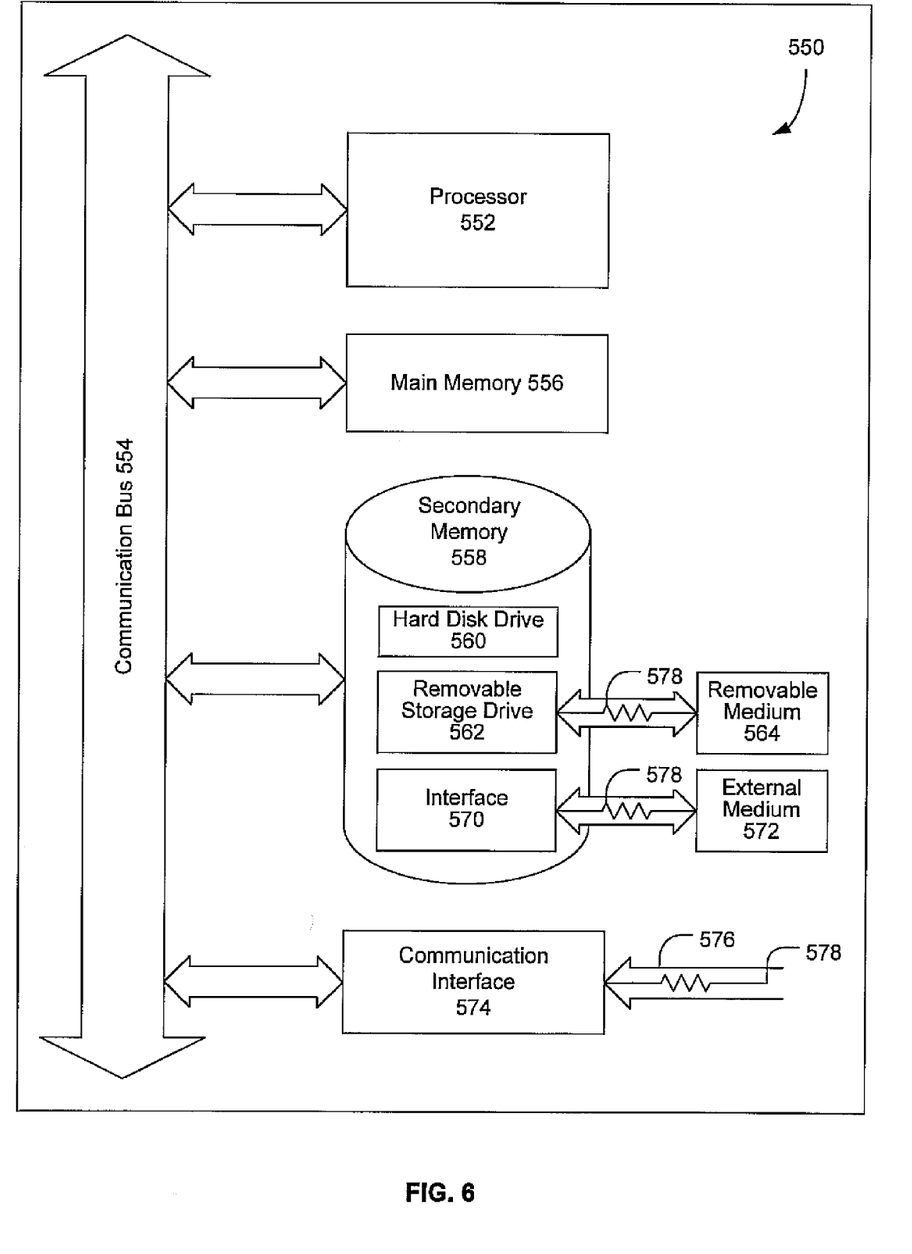
FIG. 6 is a block diagram illustrating an exemplary computer system that may be used in connection with the various embodiments described herein.

FIG. 6 is a block diagram illustrating an exemplary computer system 550 that may be used in connection with the various embodiments described herein. For example, the computer system 550 may be used in conjunction with a remote device as previously described with respect to FIG. 1. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A wireless communication device, comprising:
a communication module configured to establish a data communication link with a remote wireless communication device over a data communication network and to establish a voice communication link with the remote wireless communication device over a voice communication network;
a data storage area configured to store an application executed by the communication module, the data storage area further configured to store a phonebook comprising at least one unique identifier and an override code for the remote wireless communication device; and
a profile management module configured to receive a request from the communication module to override a silent mode of the remote wireless communication device, to obtain the override code of the remote wireless communication device from an authentication server and send the override code to the remote wireless communication device over a wireless communication network to override a silent mode of the remote wireless communication device, wherein the override code is sent to the remote wireless communication device via the data communication network.

2. The device of claim 1, further comprising an authentication module configured to verify whether a silent mode of the remote wireless communication device can be overridden.

3. The device of claim 2, wherein the authentication module retrieves the override code for the remote wireless communication device from the remote wireless communication device.

4. The device of claim 2, wherein the authentication module retrieves the override code for the remote wireless communication device from an authentication server via the wireless communication network.

5. The device of claim 2, wherein the authentication module retrieves the override code for the remote wireless communication device from the phonebook in the data storage area.

6. The device of claim 1, further comprising a control module configured to turn off a silent mode of the device upon receipt of an override code.

7. The device of claim 1, wherein the profile management module is configured to obtain the override code from the remote wireless communication device.

8. The device of claim 1, wherein the profile management module is configured to obtain the override code from the phonebook in the data storage area.

9. A computer implemented method for overriding a silent mode of a first wireless communication device communicatively coupled with a second wireless communication device via a wireless communications network having a voice communication link and a data communication link, the method comprising:
initiating a voice call to the first wireless communication device via the voice communication link of the wireless communications network;
determining that the first wireless communication device is in a silent mode;
obtaining from an authentication server an override code for the first wireless communication device; and
sending the override code to the first wireless communication device via the data communication link of the wireless communication network to instruct the first wireless communication device to exit the silent mode.

10. The method of claim 9, wherein the determining step comprises sending a message to the first wireless communication device and receiving a response from the first wireless communication device indicating the silent mode of the first wireless communication device.

11. The method of claim 10, wherein the message sending step comprises sending a Short Message Service ("SMS") message to the first wireless communication device, and wherein the response receiving step comprises receiving an SMS response from the first wireless communication device.

12. The method of claim 10, wherein the message sending step comprises sending an Internet Protocol ("IP") message to the first wireless communication device, and wherein the response receiving step comprises receiving an IP response from the first wireless communication device.

13. The method of claim 9, wherein the determining step comprises sending a message to a communication server and receiving a response indicating the silent mode of the first wireless communication device.

14. The method of claim 13, wherein the message sending step comprises sending an SMS message to the communication server, and wherein the response receiving step comprises receiving an SMS response from the communication server.

15. The method of claim 13, wherein the message sending step comprises sending an IP message to the communication server, and wherein the response receiving step comprises receiving an IP response from the communication server.

16. The method of claim 9, wherein the obtaining of the override code for the first wireless communication device comprises querying a phonebook database stored on the first wireless communication device.

17. The method of claim 9, wherein the obtaining of the override code for the first wireless communication device further comprises requesting the override code from a communication server and receiving the override code from the communication server.

18. The method of claim 9, further comprising receiving a confirmation that the silent mode of the first wireless communication device was overridden.

* * * * *